Jan. 24, 1956
F. C. VAN ARSDELL ET AL
2,731,904
CEREAL PUFFING MACHINE
Filed Sept. 19, 1951
8 Sheets-Sheet 1
FIG. 1
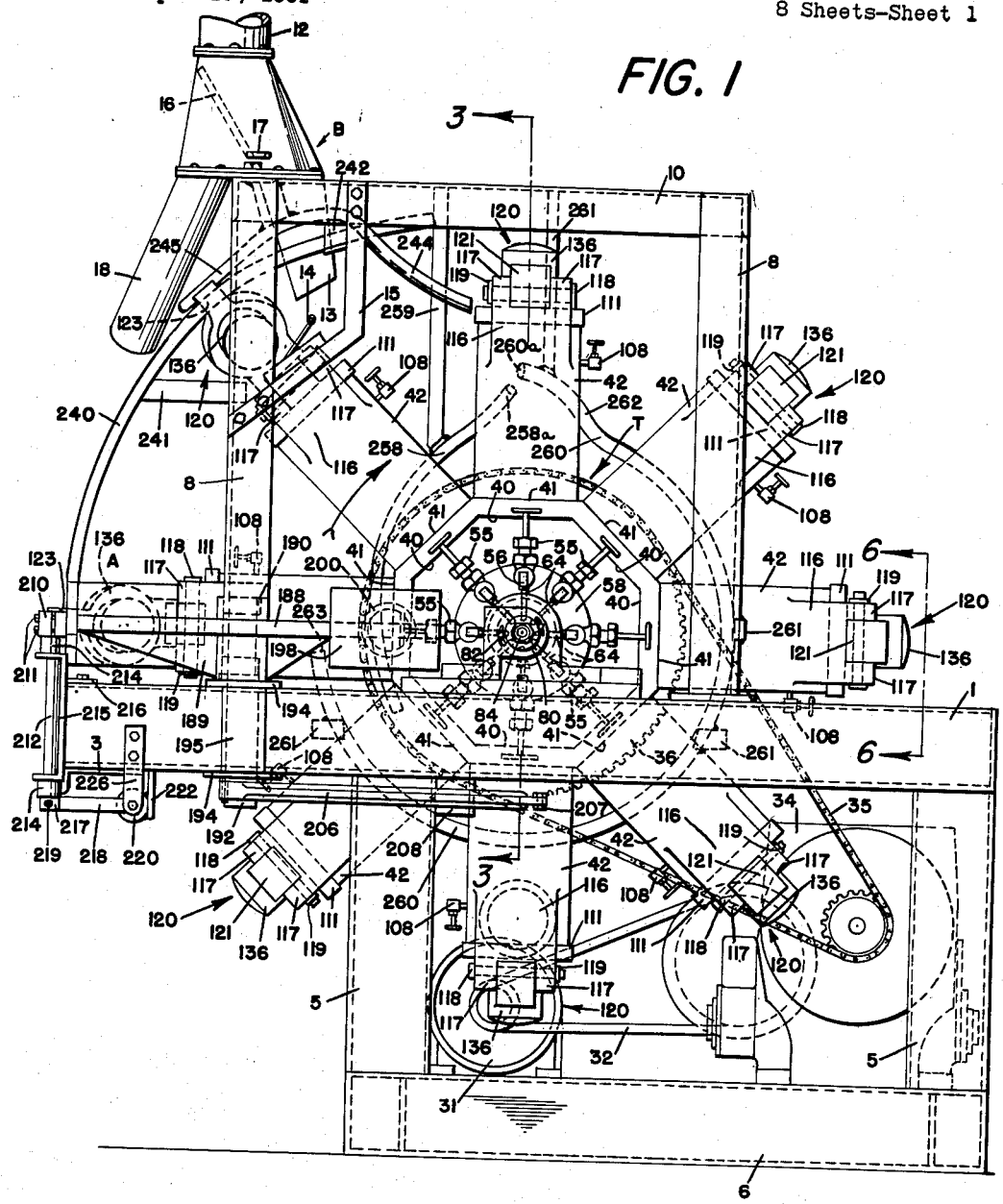
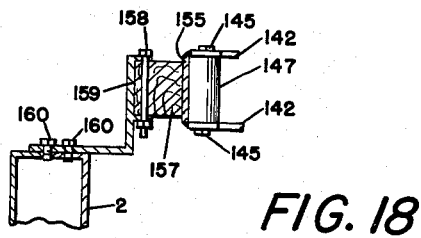
FIG. 18
INVENTORS
FRED C. VAN ARSDELL &
ELMER G. GUSTAVSON
BY
ATTORNEYS Jan. 24, 1956

F. C. VAN ARSDELL ET AL 2,731,904

CEREAL PUFFING MACHINE

Filed Sept. 19, 1951

INVENTORS
FRED C. VAN ARSDELL &
ELMER G. GUSTAVSON

BY

*Cly T Frye*

ATTORNEYS

Jan. 24, 1956     F. C. VAN ARSDELL ET AL     2,731,904
CEREAL PUFFING MACHINE

Filed Sept. 19, 1951     8 Sheets-Sheet 3

INVENTORS
FRED C. VAN ARSDELL &
ELMER G. GUSTAVSON
BY
ATTORNEYS

Jan. 24, 1956
F. C. VAN ARSDELL ET AL
2,731,904
CEREAL PUFFING MACHINE
Filed Sept. 19, 1951
8 Sheets-Sheet 4
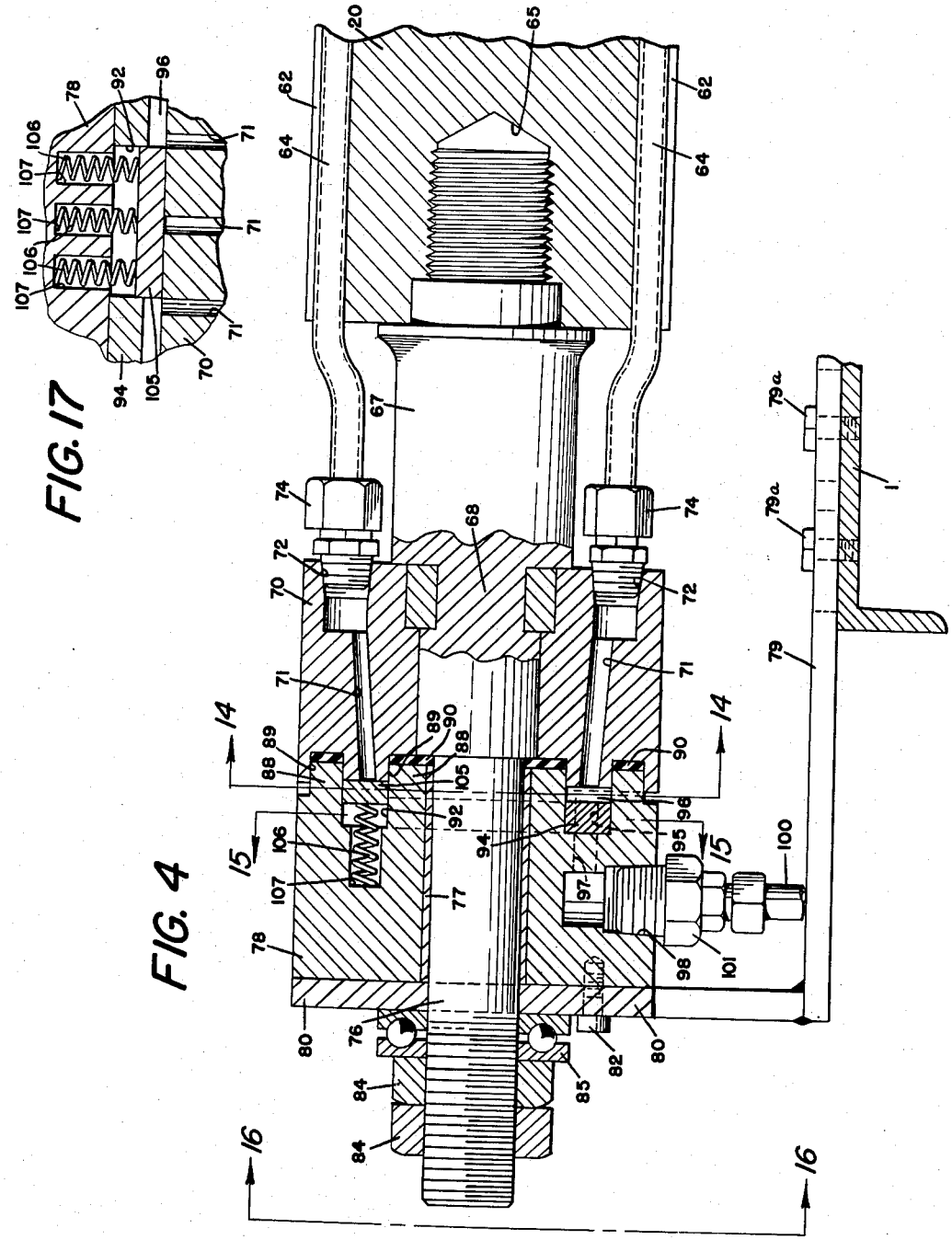
INVENTORS
FRED C. VAN ARSDELL &
ELMER G. GUSTAVSON
BY
ATTORNEYS

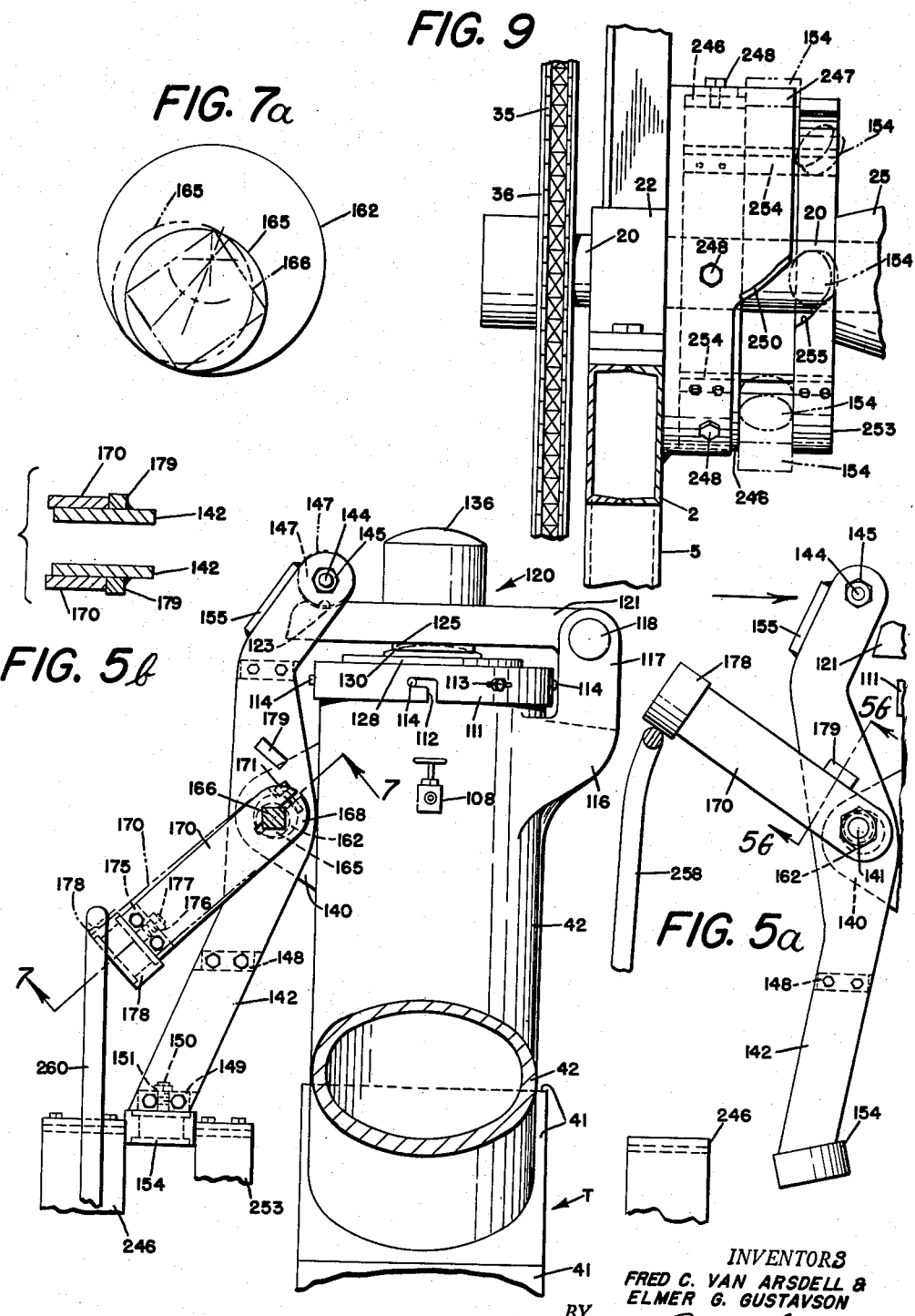

Jan. 24, 1956  F. C. VAN ARSDELL ET AL  2,731,904
CEREAL PUFFING MACHINE
Filed Sept. 19, 1951
8 Sheets-Sheet 6
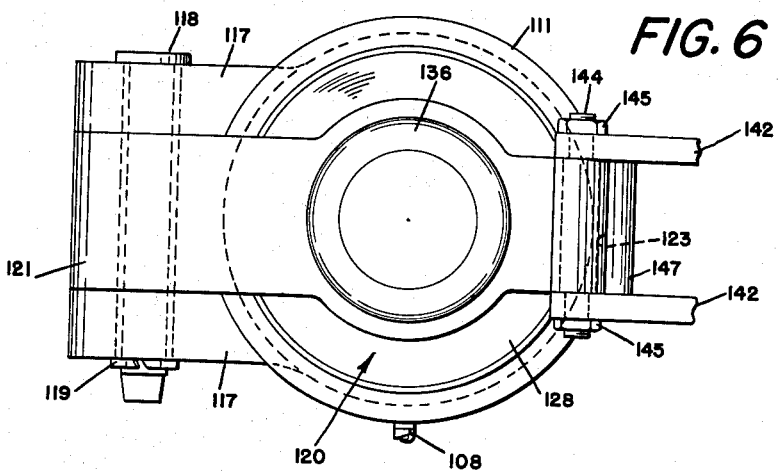
FIG. 6
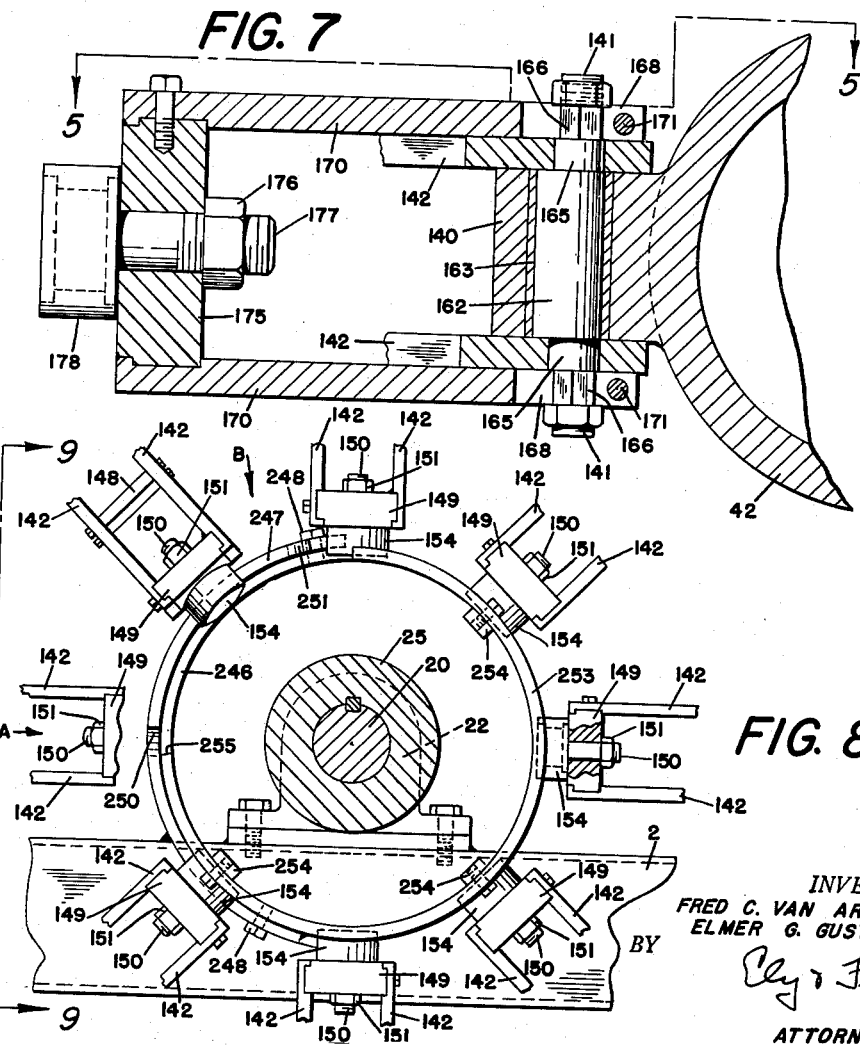
FIG. 7
FIG. 8
INVENTORS
FRED C. VAN ARSDELL &
ELMER G. GUSTAVSON
BY
ATTORNEYS Jan. 24, 1956  F. C. VAN ARSDELL ET AL  2,731,904
CEREAL PUFFING MACHINE Filed Sept. 19, 1951  8 Sheets-Sheet 7

INVENTORS
FRED C. VAN ARSDELL &
ELMER G. GUSTAVSON
BY
ATTORNEYS

Jan. 24, 1956   F. C. VAN ARSDELL ET AL   2,731,904
CEREAL PUFFING MACHINE
Filed Sept. 19, 1951   8 Sheets-Sheet 8

INVENTORS
FRED C. VAN ARSDELL &
ELMER G. GUSTAVSON
BY
ATTORNEYS

United States Patent Office 2,731,904
Patented Jan. 24, 1956

2,731,904

CEREAL PUFFING MACHINE

Fred C. Van Arsdell, Medina, and Elmer G. Gustavson, Stow, Ohio, assignors to The Quaker Oats Company, Chicago, Ill., a corporation of New Jersey Application September 19, 1951, Serial No. 247,271

39 Claims. (Cl. 99—238)

The present invention relates primarily to the art of puffing cereals, such as wheat, rice, corn and the like, for the manufacture of breakfast cereals. The principles of the invention, however, may be employed in the treatment of materials or commodities which are subjected to heat and pressure in closed guns or chambers and then the pressure suddenly released, resulting the explosion of the materials.

The invention is shown in the form in which it has been perfected for the puffing of wheat, and for the purpose of describing the invention in its best known and preferred form, the details of the mechanism will be described in detail. It will be understood that the invention in its broader aspects is not limited to the details shown and described but may be modified, varied and improved upon within the scope thereof as set forth in the appended claims.

It is the purpose of the invention to improve upon machines for this general purpose, with a view to increasing production, reducing labor and supervision costs, and to produce the finished product with greater efficiency. The machine shown and described herein operates automatically, requiring the attention of only one operator, the production of the machine exceeding that produced in the best known machines of the prior art several fold. In addition to the above, the quality of the product is greatly improved and the loss due to improperly puffed products is greatly reduced.

The invention is an improvement over the apparatus shown in the Andrews Patent No. 2,414,185, which, up to the advent of the instant invention, represented the most efficient machine for puffing cereals or the like.

It is one of the objects of the invention to provide a machine of the type specified in which there is a continuously rotating turret or gun mounting, adapted to carry a plurality of guns or chambers in which the closures or heads of the several guns are closed and locked while the turret is moving, and then the gun heads are released to explode the grain. The raw material is fed to the guns as they pass a loading point and the heads or closures are lowered on to the ends of the guns and locked. Steam at the requisite pressure is admitted to the guns preferably shortly before the heads are closed. The heads are then securely locked in position and during the greater part of the cycle steam is admitted at a controlled rate of flow and the pressure builds up to the required point until the contents of the guns are ready for the explosion, when the gun heads are released.

Only a few minutes are required for a gun to complete the cycle and guns are discharged at intervals of less than thirty seconds. The particulars of temperatures and times for any product may be readily determined and are not essential to an understanding of the invention or to enable one conversant with this art to duplicate the apparatus and to operate it successfully.

It is preferred to use the apparatus of this invention in conjunction with the preheating or the raw material. In the production of puffed wheat, for example, the preheating of the grain gives improved results when used with the apparatus of the present invention. The process of preheating grains and suitable apparatus for the purpose are fully shown and described in the prior copending application of Rupp and Proescholdt, Serial No. 165,764, filed June 2, 1950, issued as Patent No. 2,698,799 to which reference is made. It is not necessary, therefore, to enter into a discussion of that invention, it being sufficient here to state that the preheated grain is delivered in measured charges to the several guns as they pass the loading station. The chute through which the material is delivered has a standard measuring device which discharges the correct amount of grain for a gun. Several types of measuring devices are known and any one of these may be used. The measuring device is automatically actuated by the progression of the several guns through the loading station.

The major features of the invention having been stated, reference is made to the drawings and to the detailed description of the preferred form of apparatus to follow, it being noted that while the drawings and description are quite detailed, the invention is not so limited.

In the drawings:

Fig. 1 is a side elevation of a complete puffing unit;

Fig. 2 is a plan view, certain of the guns being broken away to show the internal construction;

Fig. 4 is an enlarged section through the left hand end of the main shaft for supporting the gun turret, showing the steam inlet mechanism and distributor. The location of this cross section is indicated by the line 4—4 of Fig. 15.

Fig. 5 is an elevation of one of the guns, this view being taken on the line 5—5 of Fig. 7 and showing the gun in closed and locked condition.

Fig. 5a is a view showing the position of the locking arm just before the closure is locked.

Fig. 5b is a section on the line 5b—5b of Fig. 5a.

Fig. 6 is a view looking at the end of a gun, the location of the view being shown by the line 6—6 of Fig. 1.

Fig. 7 is a section on the line 7—7 of Fig. 5, showing the details of the closure locking mechanism.

Fig. 7a is a detailed view of the eccentric for the locking mechanism.

Fig. 8 is a section on the line 8—8 of Fig. 3, showing the cam track for operating the locking mechanism.

Fig. 9 is a side view of the locking cam, the location of this view being shown by the line 9—9 of Fig. 8.

Figure 14:
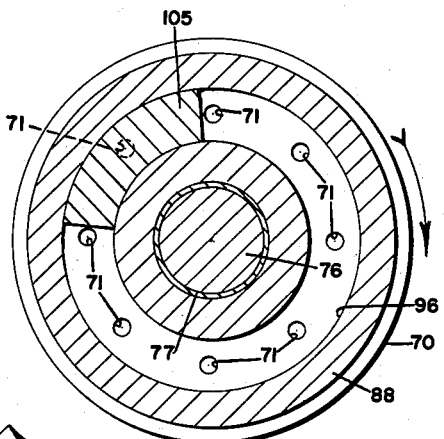
Figure 15:
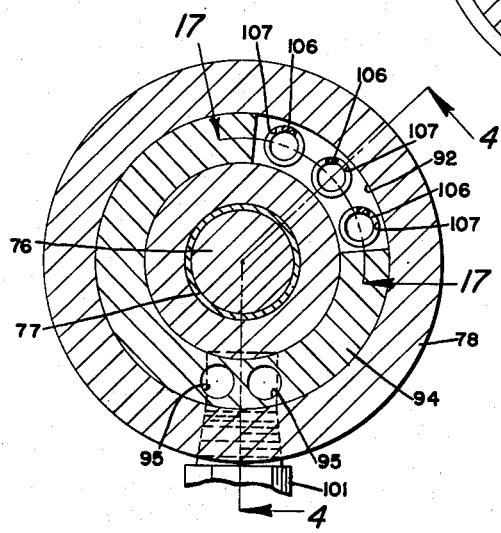

Figs. 14 and 15 are sections through the distributor for the steam supply taken respectively on the lines 14—14 and 15—15 of Fig. 4.

Figure 16:
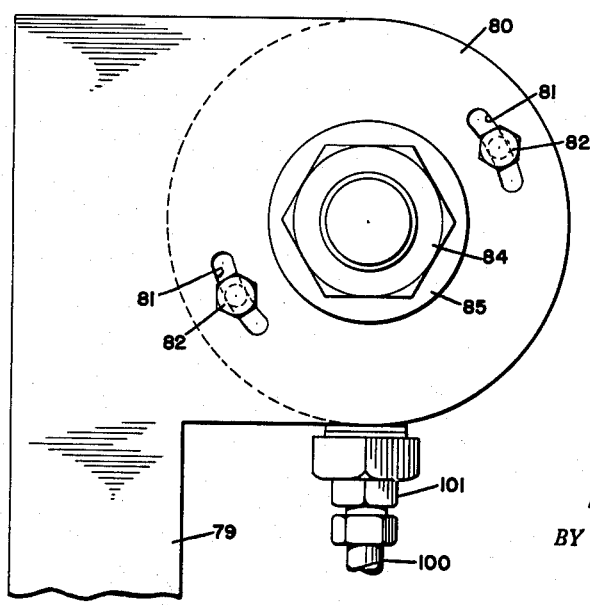

Fig. 16 is a side view of the distributor on the line 16—16 of Fig. 4.

Fig. 17 is a section on the line 17—17 of Fig. 15.

Fig. 18 is a detailed section of the bumper for the locking arm on the line 18—18 of Fig. 2.

Figure 19:
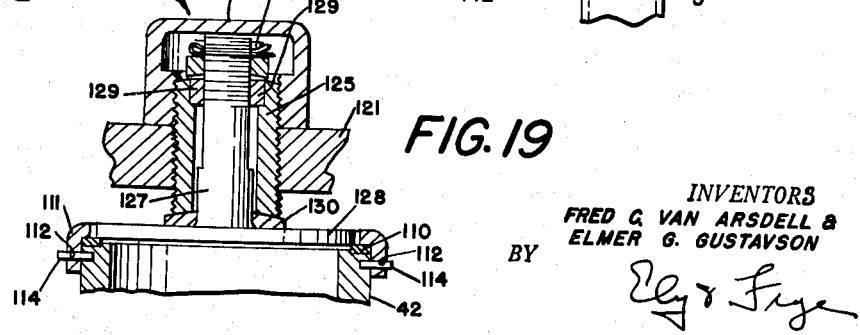
Figure 11:
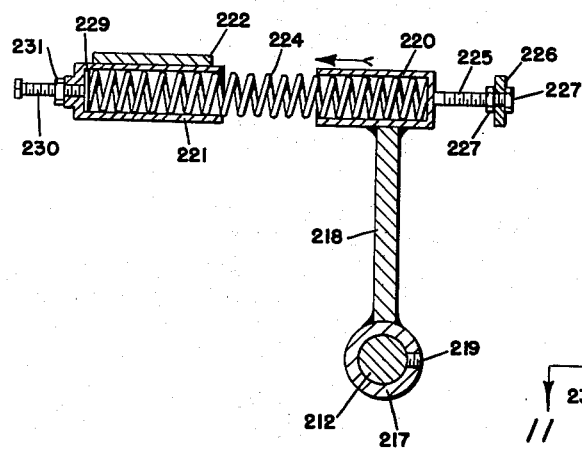
Fig. 11 is a section on the line 11—11 of Fig. 10.
Figure 10:
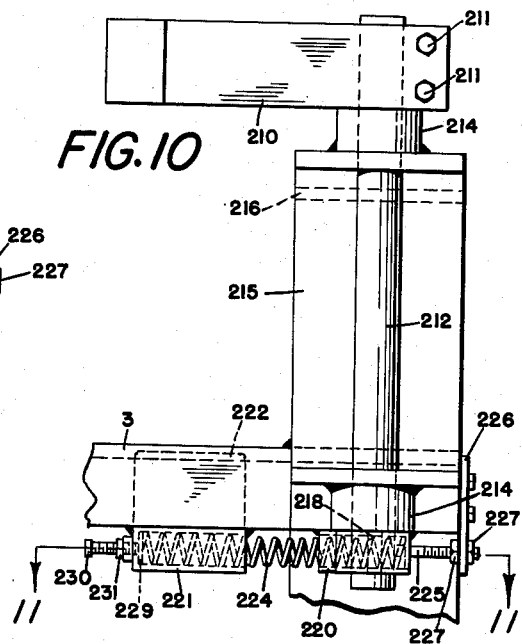
Fig. 10 is a side view of the latch device for seizing the gun closure and preventing it from rebounding after the explosion.
Figure 12:
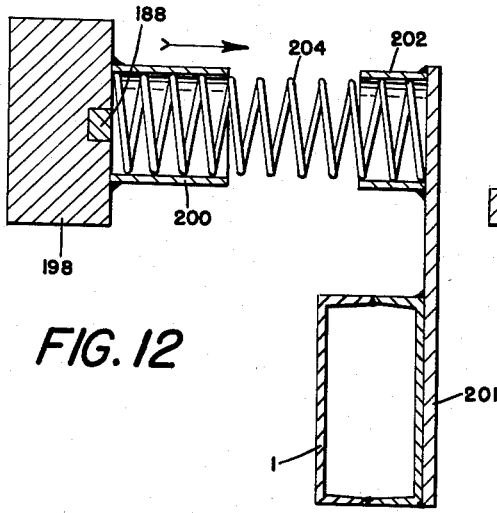
Fig. 12 is a section taken on the line 12—12 of Fig. 2, through the cushioning device which receives the impact of the heads as the guns are exploded.
Figure 13:
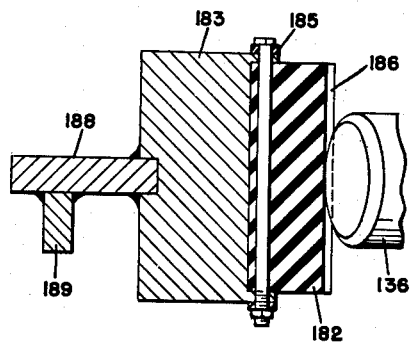
Fig. 13 is a section through the bumper for the closure on the line 13—13 of Fig. 2.

Fig. 19 is an enlarged detail of the mounting for the gun closure.

The machine frame and driving mechanism

Figure 3:
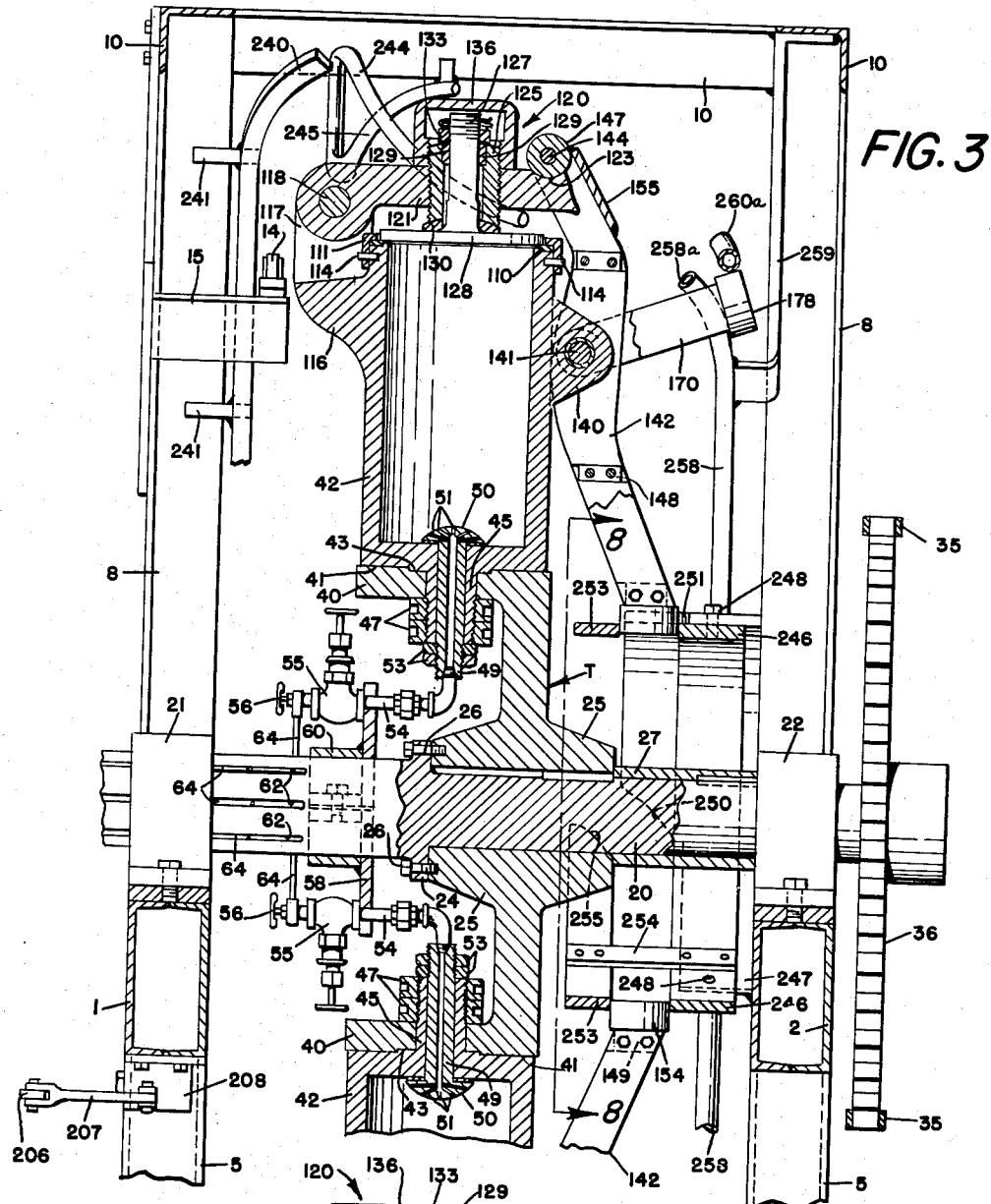
Fig. 3 is a vertical section on the line 3—3 of Fig. 1.

The machine is supported upon a stout framework which comprises two parallel horizontal beams which, as shown, are composed of two oppositely facing channels welded together. The beam to the left of Fig. 3 is given the reference numeral 1 and that to the right the reference numeral 2. At the left of Fig. 2 the beams are connected by a cross channel 3 and at the right by a cross channel 4. The beams 1 and 2 support the gun turret which is given the general reference letter T and which rotates in clockwise direction, as shown by the arrow in Fig. 1.

The beams are supported upon and welded to a rectangular framework composed of uprights 5 and a base 6, it being noted that the beams overhang the supporting framework to the left of Fig. 1, which is the area marked "A" in which the guns are exploded and at which point a bin (not shown) may be located to receive the contents of the guns as they are successively exploded.

On the beams is located a rectangular superstructure composed of vertical corner posts 8 of heavy angle iron and horizontal cross angles 10 welded together and forming a support for several cam rails to be described. At the upper corner of the superstructure over the exploding station is the loading station B, at which point is secured to the superstructure the lower end of a feed chute 12 through which the grain or other material passes to the delivery spout 13 and thence to the several guns as they move beneath the discharge end of the chute. As explained above, for the puffing of cereals this chute leads from a preheating unit and in the chute is a charge measuring device such as shown in the prior Rupp et al. application, which is operated in synchronism with the movement of the gun turret to deliver the correct charge for each gun. The charger is actuated by an electric switch 14 carried by a bracket 15. The switch is located in the path of the open gun closures, as will be described, it being sufficient for the present to state that as the several guns pass beneath the end of the chute the switch 14 will be depressed momentarily by the closure, which passes an electrical impulse to the charger, and the measured charge of grain falls into the open mouth of each gun, the speed of the turret being such as to allow all of the charge to flow into each gun as it moves past the loading point B. As will be explained, should, for any reason, a gun head fail to be retained in open position after an explosion, the switch 14 will not be operated and no grain will pass through the delivery chute into that particular gun.

The lower end of the chute 12 is provided above the spout 13 with a shiftable damper 16 which normally stands in the position shown in Fig. 1, but which may be moved by a lever 17 to bypass the charge through a secondary chute 18 should it be necessary for any reason to operate the machine without charges of material in the guns.

The turret T is keyed to a main shaft 20 between the two beams 1 and 2 and at a point substantially midway of the beams. The shaft is mounted in bearings 21 and 22, fixed to the beams 1 and 2, respectively. A shoulder 24 on the shaft 20 forms an abutment for one side of the hub 25 of the turret, bolts 26 passing through the shoulder into the hub. A sleeve 27 keyed to the shaft 20 and spanning the space between the other side of the hub and the bearing 22 likewise locates the turret. Due to the violence of the successive explosions, it is necessary to adopt the means shown, or its equivalent, to prevent dislocation of the turret.

At the side of the machine is a platform 30, on which is located the motor 31 which, through belts 32, drives a speed regulating and reducing unit 34. The output side of the unit 34, through chain 35, drives a sprocket 36 secured to the right hand end of the shaft 20 (Fig. 3). The speed of rotation of the shaft 20 is governed by the requirements of the grain or material being puffed and is a relatively slow movement to allow for the treatment of the gun contents.

The guns and steam supply

The turret T is shown as of octagon formation, so as to accommodate eight separate treating chambers, or guns as they are commonly called. This is chosen as a convenient number, but more or less chambers may be employed. The turret has been partially described. It has an outer, overhanging flange 40, the surface of which is formed with the eight flat lands 41, on each of which is mounted a chamber or gun. All the guns are alike and are given the reference numeral 42. The inner end of a gun is provided with a rectangular boss which fits in a recess 43 in a land 41. From each gun extends a radial sleeve 45 passing through a bore in the flange 40. The outer end of the sleeve is threaded to receive a pair of lock nuts 47 which hold the gun in position.

Through the center of each sleeve is a conduit 49, the inner end of which is formed with a rounded head 50 having a plurality of passages 51 radiating from the conduit to admit steam into the interior of the gun. It will be noted that the passages radiate in all directions so that the steam entering the chamber is thoroughly disseminated throughout the contents of the gun. As the gun is rotating about the axis of the turret, all of the grains will be reached by the steam.

The inner end of each conduit 49 is threaded and lock nuts 53 hold the conduits in place. Each conduit is connected to the elbow of a pipe 54 in which is located an adjustable valve 55 by which the amount of steam entering each gun is regulated. At the side of each valve 55 is a second valve 56 which can be used to shut off all steam from entering any gun without disturbing the adjustment at valve 55.

The several pipes 54 are seated in notches in the rim of a plate 58 formed as a flange on a split collar 60 clamped about the shaft 20 at one side of the turret. From the valves 56 to the outer end of the shaft and through the bearing 21, the surface of the shaft is provided with a plurality of longitudinal grooves 62 equally distributed around the shaft and equal in number to the guns on the turret. From each valve 56 is extended a flexible tube 64, usually of brass, which extends radially inward from the valve and is then bent at right angles to lie in one of the grooves 62 inside of the outer surface of the shaft.

In a socket 65 in the outer end of the shaft is threaded the inner end of a plug or rod 67 shown in detail in Fig. 4. A central portion of the plug is partially reduced as at 68 and fitted over this area is a sleeve 70 which rotates with the turret and is provided with a plurality of passages 71 equal to the number of tubes 64. The inboard side of the sleeve is provided with threaded sockets 72 communicating with the passages 71, in which are threaded several couplings 74 which connect the passages 71 and the tubes 64.

Beyond the area 68, the plug 67 is further reduced as at 76, over which is the bearing sleeve 77 on which is mounted the stationary ring-shaped distributor 78. An L-shaped bracket 79 is adjustably secured to the beam 1 by bolts 79a. The vertical arm of the bracket 79 terminates in a horizontal projection 80 in which are two arcuate slots 81. Bolts 82 pass through these slots and enter the distributor 78. The outer end of the plug is threaded and lock nuts 84 and a thrust bearing 85 bear against the projection 80 and clamp the distributor in position against the sleeve 70, the slots 81 and bolts 82 permitting a limited rotary adjustment of the distributor for the purpose to be explained.

The inner end of the distributor 78 has annular ribs 88 which fit in corresponding grooves 89 cut in the outer end of the sleeve 70 and surrounding the ports to the passages 71. Concentric gaskets 90 are seated in the grooves 89 to make a steamtight joint at these points. Between the ribs 88, a deep groove 92 is cut in the end of the distributor and in this groove is force fitted a mutilated ring 94 having two or more ports 95 therein which communicate with a space 96 between the outer face of ring 94 and the adjacent surface of the sleeve 70. The ports 95 and corresponding ports 97 in the distributor conduct steam from a socket 98 in the distributor to the space 96, a steam line 100 being connected to the socket 98 by a coupling 101.

It is necessary to the operation of the machine that steam be admitted to the several guns during the period of their travel immediately after the charge is admitted to each gun and the closure or head of the gun is closed to the point of explosion, but desirable to shut off the steam during the period that each gun is open. In actual practice, it is advisable to admit steam to the gun just before the closure is brought against the mouth of the gun to insure that the gun is filled with live steam before it is closed, and also to continue to admit steam to the gun for a short period after the closure is released to scavenge the gun completely. During the balance of the travel from station A to station B, no steam should be admitted to the gun. The exact points at which steam is admitted and then shut off are capable of adjustment so as to insure perfect working of the machine.

For the several reasons stated, the ring 94 is cut away for about one fourth of its complete circumference, as is shown in Fig. 15, which corresponds to that portion of the complete cycle in which steam is shut off from the guns. In this space between the ends of the ring, and positioned thereby, is located the short arcuate block or filler piece 105, the thickness of which is slightly greater than the depth of the space 96. This filler piece is backed up by springs 106 seated in sockets 107 in the distributor so that the filler piece is pressed against the surface of the sleeve 70 to close off the passages 71 during the arc of travel between the explosion of the guns and the closing of the several heads thereon, as has been described.

The purpose of the rotary adjustment of the distributor allowed by the arcuate slots 81 is to permit the distributor to be moved one way or the other, which will likewise move the filler piece 105 and determine the exact time when the admission of steam into passages 71 is to be shut off.

It is desirable that during the treatment of grain, or other materials of like nature, that a small amount of steam be released or bled from the guns during the treatment. Unless this provision is made, the contents of the gun will not puff properly. Only a small proportion of the gaseous contents need escape and a convenient means is to provide a small adjustable bleed valve or pet cock 108 set in the wall of each gun, the steam being permitted to escape into the room.

The gun closures

Each gun consists of a main body portion, to which the numeral 42 has been applied, a pivoted closure, or head as it is more frequently called, and a locking mechanism.

Around the outer end of each gun is machined a shallow groove in which is located a compressible gasket 110, usually of metal. This gasket is held in place by a flanged ring 111, one part of which overlies the gasket and the other part surrounds the end of the gun where it is provided with bayonet slots 112 engaging pins 114 set in the gun. By rotating the ring 111, the gasket is drawn tightly in position on the rim of the gun. A cap screw 113 may be employed to hold the ring 111 in locked position.

On one side of each gun is formed the heavy offset arm 116, the outer end of which is forked, as at 117, and provided with a transverse bearing pin 118, one end of which is headed, held in place by a split locking ring 119. On this pin is pivoted the lid or head, indicated as a whole by the numeral 120. The perfected form of head is shown in detail in Figs. 3, 6 and 19. It comprises a main arm 121 which is pivoted on the pin 118 and extends across the mouth of the gun. The outer end of the arm is formed with a transverse groove or seat 123 to receive the locking member, as will be described.

The central portion of the arm 121 at the axis of the gun is provided with a threaded opening in which is located a threaded sleeve 125. Fitting loosely within the sleeve is the stem 127 of a closure plate 128, which fits against the top of the gasket 110. The lower or inner end of the sleeve 125 and the upper or outer end of the sleeve are formed with rounded surfaces formed as portions of concentric spheres. The lower end of the sleeve bears against a correspondingly domed surface of a ring 130. The upper end of the stem 127 is threaded and on this threaded portion is a castellated nut 133, the under surface of which is hollowed out on a spherical surface corresponding to the outer rounded surface of the sleeve. Below the threaded portion of the stem 127 the stem is provided with flattened areas and the opposing faces of the sleeve are likewise flattened. Between these flattened areas are located small keys 129 which lock the sleeve 125 and the stem 127 so that they will rotate together.

This construction is for the purpose of providing an adjustable floating mounting for the closure so that it will locate itself in full contact with the end of the gun and fit tightly against the gun when the arm 121 is moved to closed position. Adjustment is made by turning the closure which, through the keys, rotates the sleeve 125 to bring the closure at the required distance from the arm. When this is done the nut 133 is brought down to a point close to but not touching the upper end of the sleeve, and then a cotter pin is inserted in the slots of the castellated nut 133 to hold the mechanism together. The whole mounting is a loose one so that the closure is free to adjust itself to the outer end of the gun, finding its seat thereon, and being allowed to rotate to the extent desired about the spherical surfaces on the ring 130, the ends of the sleeves and the underside of the nut 133, all of which are concentric.

A heavy dome shaped cap 136 covers the closure adjusting means, being threaded at its inner end to the threaded portion of the sleeve 125 which projects above the arm 121. The cap acts as the striker member which contacts the bumper (to be described), when the head flies open at the release of the locking member.

On the side of each gun opposite the arm 116 and on the side of the turret toward the drive mechanism, is cast a lug 140 in which is located a bearing pin 141 which forms the support for the head locking lever which bears the general numeral 142. The lever 142 consists of two parallel arms of somewhat S-shape near the center of which is the pin 141. The arms extend from a point adjacent the closure to a point near the shaft 20. Across the outer ends of the arms is a bearing pin 144, the ends of which are reduced and pass through the arms, where they are provided with clamping nuts 145. On this pin, between the arms, is located a roller 147 which, when the arm is moved inwardly, passes into register with the notch 123 at the outer end of the closure, to hold the closure in place as shown in Fig. 3. At a point below the pivot, the arms are braced by a cross plate 148 bolted and welded to the arms.

Across the inner ends of each pair of arms is bolted and welded a cross plate 149, in the center of which is located a bearing pin 150 held in place by nut 151. Rotatably mounted on the inner end of each pin 150 is a cam roller 154 which engages cam tracks, to be later described, which hold the lever in locking position while the several guns are moving to the explosion point A. The locking position is shown in Fig. 3 and also to the right in Fig. 2. As each gun approaches the explosion point, the arm 142 is rocked by the cam track to move the roller 147 out of the seat 123, which releases the head and it flies open under the internal pressure within the gun to the position shown at the left of Fig. 2, the arm assuming the position shown in that portion of the view.

The head remains in open position and the arm remains in its outer position until after the charge of new grain is delivered to the gun, whereupon the head is lowered onto the top of the gun by separate cam tracks for the purpose, and the lever 142 is moved by a second cam mechanism to be described, bringing the roller 147 into register with the groove 123. As the roller 147 must move into the groove 123 and then be moved toward the gun to clamp the closure in place, the lever 142 is first shifted outwardly and then moved inwardly with a powerful squeezing movement. This peculiar action is imparted to lever 142 by a second lever referred to as the "squeeze lever" to be described.

The explosion moves the head with great violence and the head is arrested by a bumper to be described. The force of the explosion also throws the upper end of the lever 142 outwardly with considerable force. To arrest the arms 142 and to absorb the shock, there is welded across the outer end of each arm a striker plate 155, and mounted on the frame, in position to be struck by the plate 155, is a bumper block 157 shown in Fig. 2 and in detail in Fig. 18. This block is a hardwood block which is secured by bolts 158 in a socket in the face of an angular bracket 159 secured to the beam 2 by bolts 160.

The "squeeze lever" referred to above is given the general reference numeral 170 and is shown more particularly in Figs. 5, 5a, 5b, 7 and 7a.

The central portion 162 of the pivot pin 141, which is in the bearing lug 140, is an eccentric which is surrounded by a bearing sleeve 163. At the sides of this part of the pin are the two bearing surfaces 165 which are eccentric to the main or central portion of the pin. It is on these two bearing surfaces that the arms 142 are mounted. Extending to either side of the surfaces 165 are squared projections 166.

Over these squared projections are received the split forks 168 of two lever arms which, together, constitute the "squeeze lever" 170. The inner surfaces of each fork 168 is likewise squared so that the two lever arms 170 move with the pin 141. A transverse bolt 171 at each fork clamps the arm to the pin. The two lever arms 170 extend toward the inner end of the companion lever 142, but diverge therefrom as shown in Figs. 5 and 5a. The arms 170 are connected at their free ends by a cross plate 175 welded and bolted to the ends of the levers. In this cross plate is secured, by nut 176, the bearing pin 177 of a cam roller 178. This cam roller is engaged by a further cam track to be described, which rocks the "squeeze lever" 170 to first raise the roller 147 over the end of the arm 121 and then move it inwardly to draw the head against the mouth of the gun.

The "squeeze lever" 170 moves about the axis formed by the eccentric bearing pin 141 in an arc, the sweep of which is shown by comparing Figs. 5 and 5a. In one phase of its movement the "squeeze lever" is moved by its cam to its lowermost position, as shown in Fig. 5. This arm, because it has then rotated the eccentric 162 to the full line position of Fig. 7a, exerts a powerful force, drawing the roller 147 inwardly against the notch 123. At this time the two arms 142 and 170 act in the manner of a toggle, which is operative after the head is lowered and after the arm 142 has moved into position with the roller 147 over the seat 123. At this time, the arm 142 is erect, the roller 178 is beneath and inside of its operating cam, and the arm 170 has moved into the position shown in dotted lines in Fig. 5. If now the arm 170 is moved downwardly, to the full line position shown in Fig. 5, the rotation of the eccentric 162 will draw the roller 147 against the seat with a powerful squeezing effect. This operation is performed by the cam mechanism to be described. This camming effect continues until the gun has been fired, whereupon the lever 170 is freed, which is shortly after the movement of the main arm 142 to unlocking position.

The other phase of movement of the lever 170 occurs in the interval between the firing and a point just after the closure is positioned over the mouth of the gun. The purpose of the movement of the "squeeze lever" is twofold, in that the lever 170 is rocked to bring the upper end of lever 142 over the end of the closure arm 121 and, at the same time, the roller 147 is lifted over the end of the arm to later seat in the groove 123.

After the gun is fired, the roller 178 is picked up by a second section of the cam track, riding on the outside of the track, and is gradually raised to the position shown in Fig. 5a, which is at a point just before the gun reaches the twelve o'clock position in its cycle of rotation. At this time the gun closure has been lowered over the mouth of the gun. The eccentric 162 is now rotated so that instead of drawing the arm 142 toward the axis of the turret it moves the arm 142 outwardly to clear the roller 147 so that it may move across the end of the arm 121 in position to be subsequently moved into the groove 123. At this time, the roller 154 is free of its cam track and the arm 142 stands outwardly in the position shown in Fig. 5a.

As the "squeeze lever" 170 approaches the top of its movement, the arms thereof strike lugs 179 welded to the arms 142. Continued upward movement of the "squeeze lever," acting through the lugs 179 rocks the lever 142 in the direction of the arrow at the top of Fig. 5a to move the lever to the position shown in Fig. 5. At the end of this movement the section of the cam track which has raised the "squeeze lever" terminates and the other section of the cam track takes over, the roller 178 passing beneath that section to draw the closure against the mouth of the gun in the manner described.

*The closure bumper*

A closure or head assembly is quite heavy, as it must be to resist the pressures within the gun. Also, the force of the explosion is violent, so that the head is thrown outwardly with great force. As the guns are being fired at intervals of less than a minute, the accumulated effects of the blows require that adequate means be provided to stop the head and to absorb the shocks so that the machine will not be shaken to pieces. It is also necessary to hold the head from rebounding.

To meet these conditions, the mechanism now to be described has been designed, particular reference being made to Figs. 1 and 2, which show the bumper mechanism in relation to the machine, and Figs. 10 to 13, inclusive, which show details thereof.

At the firing or explosion point A, and on the overhanging portion of beam 1, is located a bumper block 182 preferably of a hard rubber composition adapted to withstand the repeated blows as the caps 136 of the several guns are thrown against it. This bumper is located in a socket on the face of a heavy metal block 183 and is held in position by transverse bolts 185 which pass through the base of the bumper. Angular brackets 186 are attached to the sides of the block 183 and overlap the two vertical edges of the bumper.

The block 183 is welded on the end of a lever arm 188 which is braced by a central rib 189 and is provided at a midway point with a vertical bearing sleeve 190. This bearing sleeve fits over and is keyed to a vertical shaft 192, located at the side of the beam 1. Upper and lower bearing plates 194 are fixed to the upper and lower surfaces of the beam 1 and are connected by a bearing sleeve 195 which houses the shaft 192, the lower end of the shaft projecting below the lower plate 194.

The end of the lever arm 188 beyond the pivot has welded thereto a heavy block of metal 198, the mass of which is adapted to absorb much of the shock imparted to the arm by the head. To the inside of the block 198 is welded a deep cup 200 and to the inner face of the beam 1 is welded a plate 201, to the upper end of which is welded a second cup 202 facing the cup 200. A heavy compression shock absorbing spring 204 is located between the cups and serves to cushion the blows of the heads.

As a further means for cushioning the blows and to snub the recoil of the bumper assembly, an arm 206 is keyed to the lower end of the shaft 192. This arm extends to a point near the axis of the turret, where it is connected by a link 207 to a shock absorber 208 secured to the underside of beam 1. (See Fig. 3.)

The bumper mechanism just described is an effective means of absorbing the repeated shocks delivered by the heads as they fly open when the guns reach the firing station.

As indicated above, it is necessary to provide means for catching the head so that it does not rebound, but will be held in fully open position shown in Fig. 2 after firing. The purpose is not only to hold the head from rebounding, but also to insure that the head will be in the correct position to engage the cam track (to be described), which lowers the heads over the mouths of the guns as the turret T continues its rotation.

The outer end of the arm 121 just beyond the groove 123 is formed, as shown in Fig. 3. This is the surface which is caught by the closure holding means. This means comprises a heavy, hook-shaped arm 210, the hooked end of which is beveled and lies in the path of the arm 121 as the head flies open. The inner end of the arm 210 is split and held by bolts 211 on the upper end of a vertical shaft 212 which is rotatable in aligned bearings 214. Bearings 214 are welded to the upper and lower horizontal surfaces of a channel shaped bracket 215, secured to the left hand end of the beam 1 by plate 216 and resting against the outer face of the channel cross beam 3.

Over the lower end of the shaft 212, below the lower bearing 214, is fitted the end of a sleeve 217 having welded thereto an arm 218 and fixed to the shaft by setscrew 219.

To the end of arm 218 is welded a cup 220. To the inner vertical web of the cross beam 3 is welded a plate 222 and on this plate is fixed a cup 221 facing the cup 220. A compression spring 224 is located between the two cups and tends to hold the hook 210 in position to engage the heads 120. A set screw 225, which is threaded in a plate 226 attached to the outer face of the beam 1 limits the inner swinging movement of the hook assembly, lock nuts 227 holding the set screw from shifting. The degree of compression of the spring 224 is regulated by a plate 229 set in the bottom of the cup 221 and adjusted by the set screw 230 and lock nut 231.

The spring 224 is sufficiently strong so that the instant a gun closure flies open, the hook 210 will yield to pass the end of the arm 120 and snap back behind the arm to retain the head in its open position. As the turret rotates, the closure will pass above the hook, but it will then be guided by the closure operating cams as indicated above.

This closure retaining means will function properly in almost all cases but occasionally a closure will not be caught by the hook, in which case the head may stand in a partially open or ajar position and cause injury to the machine as it is carried upwardly. To prevent an accident of this nature, one of the closure operating cams is provided with an extension which projects into the path of a partially open gun closure and acts to shut the head against the mouth of the gun and in such position the continued rotation of the turret will do no injury to the machine.

The closure operating cams (a) *The head closing cams.*—Starting with a gun at the firing position and with the head standing at the angle shown at the right of Fig. 2, where it is engaged by the hook 210, the first consideration is to insure that the head stays in that position until after it has passed the loading station B and then to lower the head over the mouth of the gun.

For this purpose there is provided a long cam rail or cam track 240, the lower end of which is at the hook 210, in position to engage the outer end of the arm 121 as the turret rotates. This rail in side elevation as shown in Fig. 1 is concentric to the axis of the turret and the head slides along this cam in fully opened position until it reaches the loading point. At this point the side of the cap 136 strikes and depresses the switch 14, which is in the path of the head, and the measured charge of material is emptied into the gun. At this point, looking at the top of the cam rail 240 in Fig. 1, the rail curves inwardly for an arc sufficient to overbalance the head, which will now move by gravity to its closed position.

The cam rail 240 is fixed in position by arms 241 and 242 attached to the adjacent members 8 and 10, respectively, of the superstructure.

It is desirable not to permit the head to fall freely but to lower it easily onto the end of the gun. For this purpose, a second cam rail 244 is provided, spaced from the rail 240 and welded to the upper cross member 10 of the superstructure. Looking at the rail 244 from above, it follows the curvature of the rail 240 but extends beyond the far end of that rail. Looking at this cam rail 244 from the side, it gradually approaches the center of the machine and its purpose is to receive the arm 120 after the head has been overbalanced by the rail 240 and to support the head while it gradually lowers onto the mouth of the gun. Closing of the head occurs at the time the gun reaches the uppermost or 12 o'clock position in the cycle of the turret.

Reference has been made to the fact that the gun closure may not be caught by the hook 210 and instead of closing against the mouth of the gun it may assume a dangerous position partially closed. In such case, the head should be moved to fully closed position before the gun moves to the loading position. For this purpose, the cam rail 244 is provided with a rearward extension 245 which is curved downwardly and toward the center line of the machine in position so that any partially open head will strike against the underside of the extension and be moved to fully closed position. The configuration of this extension will be understood by comparing the showing thereof in Figs. 1, 2 and 3. As the loading switch 14 lies in the path of the cap 136 when the closure is open, the loader will not operate while this particular gun is passing the loading point, but the locking mechanism will function to close and lock the empty gun so that it will go through the cycle and be fired idly.

(b) *The locking arm cam.*—This is composed of two cam rails and a cam plate which act upon the several cam rollers 154 to rock the arms 142 between the head locking position shown in Figs. 3 and 5 and at the right hand sid of Fig. 2 and the head releasing position shown at the left of Fig. 2. Each arm 142 remains in the former position from the time that the head is lowered at the top of a gun cycle until the gun reaches the firing point, when it is quickly withdrawn, permitting the explosion to take place. For the balance of the cycle, the arm remains in its outer position and is therefore free so that the "squeeze lever" may operate thereon when it is raised, as shown in Fig. 5a and as previously described.

This cam assembly is best shown in Figs. 3 and 9. It comprises two rails located between the turret T and the turret drive mechanism. The rail toward the rear of the machine is given the reference numeral 246. This rail is a full circle and is supported on the framework by a cam plate 247 which is arcuate in form and extends over that portion of the cycle between the six o'clock and twelve o'clock positions, as will be seen from Fig. 8. The rail 246 is secured to the plate 247 by bolts 248, and the plate 247 is welded to the framework. The edge of the plate 247 toward the turret follows the edge of the rail 246 to the firing point, where it is formed with a relatively abrupt inward cam surface 250, shown in Fig. 9. From that point to the twelve o'clock position, the edge of the plate lies in the inward plane and then the edge of the plate is terminated by the abrupt outward slope 251 (Fig. 2).

The outer rail of this cam mechanism is given the reference numeral 253. It is attached to and carried in spaced relation to the rail 246 by cross straps 254 bolted to the rails. This cam rail extends from a point adjacent the upper end of the plate 247 to just short of the firing point, where it terminates in a surface 255 parallel to the surface 250 on the plate 247. The opposing faces of the rails 246 and 253 are spaced apart to receive the rollers 154 and are parallel. Their function is to hold the lever arms 142 in locking position during the time that the grain is treated. As the rail 253 terminates just short of the firing point, it allows the surface 250 to move the cam rollers 154 outwardly, releasing the gun heads. This movement of the cam rollers 154 is shown in Fig. 9. As the several rollers 154 approach the top of the cycle, they are lowered to their locking position by riding down the surface 251. This restores the roller 147 to position in register with the groove 123.

(c) *The squeeze arm cam.*—This cam is made in two sections, one of which is given the reference numeral 258 and the other the reference numeral 260. The section 258 extends from the firing point to the top of the cycle at the point where the gun closure is moved against the mouth of the gun. Looking at this section of the cam rail from side elevation, as in Fig. 1, it starts from a point near the axis of the turret and gradually diverges therefrom to its upper end. At the upper end, the rail is bent inwardly sharply, as shown at 258a. This section is supported from the frame by welding its lower end to the beam 2 and welding it at a midway point to an angular bracket 259 fastened to a overhead angle iron 10.

The roller 178 on the end of the squeeze lever 170 rides on top of this section of the cam, being picked up by the rail as the gun moves from firing position. Its function is to rock the squeeze lever in the manner shown in Fig. 5a, which movement in turn rocks the lever 142 and at the same time raises it so that the roller 147 may move into the groove 123. When the gun has reached a point opposite the upper end of the rail 258, the roller 154 enters the space between the edges of the cam rails 246 and 253, and these cams hold the lever 142 in its locked position. An inspection of Fig. 2 will show the relationship of the terminus of the cam rail 258 and the beginning of the slot between the cams 246 and 253.

As the roller 178 leaves the rail 258, it is delivered to the cam section 260, the receiving end of this cam rail 260 being curved outwardly sharply at 260a to receive the roller 178. The roller 178 rides beneath the cam rail 260.

The function of this section 260 of the squeeze cam is to act on the rollers 178 to move the arms 170 toward the arms 142 and exert the toggle action which draws the roller 147 down onto the seat 123. Its active period is from just after the arms 142 are moved to locking position until shortly after the guns reach the firing point.

The rail 260 is shown in side elevation in Fig. 1 and in plan in Fig. 2. The rail is attached to the framework at various points where it intersects the several members thereof by means of a plurality of brackets which are given the reference numerals 261 and are either bolted to adjacent parts of the frame or welded thereto. The brackets are all welded to the rail.

Looking at the rail 260 as shown in Fig. 1, it has a rather short abrupt section 262 which approaches the axis of the turret and from this point the rail is concentric with the axis of the turret until it reaches a point 263 just past the firing point, which is also just after the roller 154 has been acted on by the cam surfaces 250 and 255. The purpose of the section 262 is to exert the squeeze on the gun closure and the balance of the cam section 260 is to hold it in that position. The reason why the release of the roller 178 is delayed momentarily after the cam surfaces 250 and 255 have acted is to insure a sudden release of the gun closure. To be effective, the gun closure must not be allowed to open slowly because the explosive effect will be dissipated and the holding of the gun closure by the end 263 of the rail during the period that the roller 147 is moving through the cam sections 250 and 255 is to insure a sudden release of the closure. By extending the cam rail 260 to the point 263, the inward pressure is maintained on the closure until the roller 147 has passed off the end of the arm 121. Were this inward squeeze not maintained, the closure would tend to crack open during the period that the roller 147 is moving from its seat in the groove 123 to the end of the arm and the pressure in the gun would be largely dissipated before the instant of firing.

This provision for preventing loss of pressure in the gun during the period that the cam surfaces 250 and 255 are shifting the closure locking means from fully locked to fully released position is an important feature of the invention and one which makes it possible to have an instantaneous release of the gun closure, although the gun is in motion at the time.

Résumé

The operation of the gun will be understood from the description which has been given and only a brief résumé will be given.

In regular operation, the guns pass in succession into the loading zone with their heads raised and held in raised position by the cam rails 240 and 244. The caps 136 will strike the switch 14 and a measured charge of the material will pass into each gun, the rate at which the gun passes the spout 13 permitting the whole charge to pass into the gun without loss. The heads will now be lowered onto the guns and the locking arms 142 and the squeeze arms will come into play, actuated by their respective cam devices.

During the travel up to this point, steam has been shut off from the guns by the interposition of the plate 105 over the ports 71 leading to the guns that are in this portion of the cycle, but preferably just before any gun reaches the top of the cycle the port to that gun will pass beyond the end of the plate 105 to fill the gun with live steam.

The guns, the heads of which are now firmly locked, continue through the balance of the cycle, pressure building up in the guns, thoroughly treating the contents and preparing them for the explosion. As the guns reach the firing point, the locking mechanism is released and the heads fly open, discharging the material which is puffed by the sudden release of pressure.

One of the problems solved by the invention is the instantaneous release of the gun closures, which is necessary to secure the explosion upon which the puffing of the material depends. In the old single guns, which are stationary at all times, the head is released by a hammer blow delivered against the head lock, and in the prior Andrews Patent 2,414,185, the gun is stationary during the firing operation. However, when a continuously rotating turret was developed, in which the closure locking mechanism is released by a cam operative through rotation of the turret, the problem of obtaining the instantaneous release of the closure was encountered. This problem was solved by the ingenious combination of locking levers, squeeze levers and cam rails operating in the manner described.

At the firing point, the gun heads are caught by the hook 210 and the force of the blow delivered by the gun head is taken by the bumper 182 and absorbed by the mechanism associated with the bumper. The blow delivered by the locking lever is also absorbed by the bumper block 157. The heads are held open until they pass by rotation of the turret above the hook 210, where they pass onto the cam rails 240 and 244 and the cycle starts over again. In the event the hook does not work properly, the cam section 245 comes into play, as has been described.

The plate 105 shuts off steam to the guns at the firing point, although a brief shot of steam after the instant of firing is desirable to scavenge each gun.

An extremely efficient and economical puffing machine has been perfected, which will greatly reduce the cost of production of puffed materials and is particularly adapted for the treatment of edible grains. The preheating which is desirably used in connection with this machine improves the product and contributes to the efficiency of the machine.

While the machine is primarily designed for the puffing of edible grains, such as wheat, rice, and corn, it may be used for puffing other materials which can be treated in a manner similar to that used for the treating of cereals. Therefore, in the claims, where the expression "cereals or the like" is used, this expression is intended to include not only edible grains but any other materials which may be expanded by the use of the machine. For example, minerals which are exploded to increase their bulk for heat insulating purposes may be treated in the machine.

What is claimed is:

1. A machine for treating cereals or the like comprising a turret, means to rotate the turret continuously, a plurality of treating chambers on the turret, movable closures at the ends of the chambers, means to admit steam to the interiors of the chambers while they are rotating, means located in the cycle of the turret acting on the closures to bring them successively onto the ends of the chambers and lock them in that position while the turret is rotating, and means operated by the rotation of the turret to release the closures at a further point in the cycle of the turret.

2. A machine for treating cereals or the like comprising a turret, means to rotate the turret continuously, a plurality of treating chambers on the turret, movable closures at the ends of the chambers, means to admit steam to the interiors of the chambers while they are rotating, and cams acting upon the closures and operative on rotation of the turret to move the closures successively onto the ends of the chambers at one point in the cycle of the turret and at a further point in the cycle of the turret to release the closures instantaneously while the turret is rotating.

3. A machine for treating cereals or the like comprising a turret, means to rotate the turret continuously, a plurality of treating chambers on the turret, movable closures at the ends of the chambers, means to admit steam to the interiors of the chambers while they are rotating, a stationary cam in the path of the closures operative by rotation of the turret to move the closures successively on to the mouths of the chambers, and a second cam to release the closures instantaneously during further rotation of the turret.

4. A machine for treating cereals or the like comprising a turret, means to rotate the turret continuously, a plurality of guns on the turret, a pivoted head on each gun, a locking device on each gun, means located at one point in the cycle of the turret and operative while the turret is in motion to close the head on each gun, and means operative thereafter to actuate the locking device to lock the head against the gun while the turret is rotating, and means operative at a further point and while the turret is in motion in the cycle to release the locking means instantaneously.

5. A machine in accordance with claim 4 in which the means to close the heads is a cam located beside the turret in the path of the heads.

6. A machine in accordance with claim 4 in which the means to actuate the locking device and to thereafter release it is a cam located beside the turret in the path of the locking device.

7. A machine for treating cereals or the like comprising a turret, means to rotate the turret continuously, a plurality of guns on the turret, individual conduits to admit heating fluid to each gun, a pivoted head on each gun, a locking arm on each gun movable to and from a position over the head when it is closed against the end of the gun, a cam operative during the rotation of the turret to lower each head onto the end of its gun as it reaches one point in the cycle of revolution of the turret, a second cam operative thereafter to shift the locking arm over the head while the turret is rotating, and a cam operative by the rotation of the turret at a further point in the cycle of the turret to shift the locking device from locking position and permit each head to fly open by the pressure in its gun.

8. In a machine for puffing cereals or the like, a continuously rotatable turret, means to rotate the turret, a plurality of guns on the turret, a head at the end of each gun, a locking lever pivoted on each gun, cam means operative during the rotation of the turret to lower the heads successively over the mouths of the guns as they pass one point in the cycle, and cam means operated thereafter during the rotation of the turret to move the locking lever over the gun head, means operative to draw the end of the locking lever into tight engagement with the head of each gun, and means to actuate said drawing means operative during the rotation of the turret.

9. In a machine for puffing cereals or the like, a rotatable turret, means to rotate the turret, a plurality of guns on the turret, a head at the end of each gun, a toggle on each gun, means operative to lower the heads successively over the mouths of the guns, means operative during rotation of the turret to shift one arm of the toggle over the head of its gun and thereafter to actuate the toggle to draw the end of the arm against the closed head.

10. In a machine for puffing cereals or the like, a rotatable turret, means to rotate the turret, a plurality of guns on the turret, a head at the end of each gun, a toggle on each gun, means operative to lower the heads successively over the mouths of the guns, means operative during rotation of the turret to shift one arm of the toggle over the head of its gun and thereafter to actuate the toggle to draw the end of the arm against the closed head, and means to shift the toggle off the head at a later point in the cycle of the turret.

11. A machine in accordance with claim 9 in which the means for actuating the toggle are cam rails at the side of the turret over which the members of the toggle move during rotation of the turret.

12. In a machine for puffing cereals or the like, a movable treating chamber, a closure for the treating chamber, a toggle on the treating chamber, one arm of the toggle being movable to bring the end of the arm into locking position over the closure, and a second arm of the toggle movable toward the first said arm to draw the end of the first arm against the closure, and means to actuate the arms of the toggle successively during movement of the chamber.

13. In a machine for puffing cereals or the like, a treating chamber, a conduit to pass steam into the chamber, a pivoted closure for the mouth of the treating chamber, means to move the closure over the mouth of the chamber, a lever at the side of the treating chamber, an eccentric pivot pin on which said lever moves to shift the end of the lever toward and from a position over the closure, a second lever attached to the pivot pin, and means for moving the second lever to rotate the pivot pin and draw the end of the first named lever against the closure.

14. In a machine for puffing cereals or the like, a rotatable turret, treating chambers on the turret, means to rotate the turret continuously, a plurality of treating chambers on the turret, conduits to pass steam into the treating chambers, a pivoted closure for each chamber, means to move each closure over its chamber during the rotation of the turret, a lever at the side of the treating chamber, an eccentric pivot pin on which the lever moves to shift the end of the lever toward and from a position over the closure, a second lever attached to the pivot pin, means operative at one point during the cycle of the turret to rock the first said lever to bring its end over the closure, and means also operative during the rotation of the turret and when the end of the first lever is over the closure to move the second lever to rotate the pivot pin and draw the end of the first named lever against the closure.

15. A machine in accordance with claim 14 in which the means for moving both said levers are cam tracks located at the side of the turret over which said levers move during the rotation of the turret.

16. In a machine for puffing cereals or the like, a rotatable turret, treating chambers on the turret, means to rotate the turret continuously, a plurality of treating chambers on the turret, conduits to pass steam into the treating chambers, a pivoted closure for each chamber, means to move each closure over its chamber during the rotation of the turret, a lever at the side of the treating chamber, an eccentric pivot pin on which the lever moves to shift the end of the lever toward and from a position over the closure, a second lever attached to the pivot pin, means operative at one point during the cycle of the turret to rock the first said lever to bring its end over the closure, means also operative during the rotation of the turret and when the end of the first lever is over the closure to move the second lever to rotate the first pin and draw the end of the first named lever against the closure, and means operative at another point in the cycle of the turret to rock the first named lever to release the closure.

17. In a machine for puffing cereals or the like, a rotatable turret, a plurality of guns radiating from the turret, closures movable over the guns, means at one point in the cycle of the turret to move each closure against the mouth of its gun and to lock the closure against the gun, means at another point in the cycle to release the closure of each gun, a steam conduit connected to each gun, a single steam supply chamber communicating with all of said conduits, and means operative by the rotation of the turret to close the conduits leading to the guns while the closures for those guns are open.

18. In a machine for puffing cereals or the like, a rotatable turret, a plurality of guns radiating from the turret, closures movable over the guns, means at one point in the cycle of the turret to move each closure against the mouth of its gun and to lock the closure against the gun, means at another point in the cycle to release the closure of each gun, a steam conduit connected to each gun, an annular steam supply chamber communicating with all of said conduits, and a block in said chamber closing the conduit which leads to each gun while the closure on that gun is open.

19. In a machine for puffing cereals or the like, a rotatable turret, a plurality of guns radiating from the turret, closures movable over the guns, means at one point in the cycle of the turret to move each closure against the mouth of its gun and to lock the closure against the gun, means at another point in the cycle to release the closure of each gun, a steam conduit connected to each gun, an annular steam supply chamber communicating with all of said conduits, a block in said chamber closing the conduit which leads to each gun while the closure on that gun is open, and means for shifting the position of said block.

20. A machine for puffing cereals or the like, comprising a turret, means to rotate the turret continuously, an open ended chamber on the turret, means to admit fluid pressure to the interior of the chamber during rotation of the turret, a closure at the mouth of the chamber, means to move the closure over the mouth of the chamber, at one point in the cycle of the turret, a lock movable over the closure after it is in contact with the chamber, means acting on the lock immediately after it has moved over the closure to draw the closure to a fluid-tight fit against the mouth of the chamber, means to shift the lock off the closure at another point in the cycle of the turret, said drawing means being operative from the time that the lock has been drawn against the closure until the lock has freed the closure.

21. A machine for puffing cereals or the like comprising a turret, means to rotate the turret continuously, an open ended chamber on the turret, means to admit fluid pressure to the interior of the chamber during rotation of the turret, a closure at the mouth of the chamber, means to move the closure over the mouth of the chamber, at one point in the cycle of the turret, a lock movable over the closure after it is in contact with the chamber, means acting on the lock immediately after it has moved over the closure to draw the closure to a fluid-tight fit against the mouth of the chamber, a cam to shift the lock off the closure at another point in the cycle of the turret, and means to hold the drawing means against the closure while the cam is shifting the lock.

22. A machine as described in claim 20 in which the turret is provided with a plurality of chambers, each of said chambers having a closure lock and drawing means associated therewith.

23. A machine for treating cereals or the like comprising a turret, means to rotate the turret continuously, a plurality of open ended treating chambers on the turret, pivoted closures at the mouths of the chambers, means at one point in the cycle of the turret to move a closure over the mouth of each chamber, each chamber having a locking lever pivoted thereon, a squeeze lever connected to the locking lever, means acting on the locking lever to move it over the closure after the closure is moved over the mouth of its chamber, and means acting on the squeeze lever thereafter to draw the closure in fluid-tight contact with the mouth of the chamber, means at a later point in the cycle of the chamber to shift the locking lever off the closure, said squeeze lever actuating means being operative until the lever has cleared the closure.

24. A machine for treating cereals or the like comprising a turret, means to rotate the turret continuously, a plurality of open ended treating chambers on the turret, pivoted closures at the mouths of the chambers, means at one point in the cycle of the turret to move a closure over the mouth of each chamber, each chamber having a locking lever pivoted thereon, a squeeze lever connected to the locking lever, a cam alongside the turret to move the locking lever over the closure after the closure is moved over the mouth of its chamber, a second cam acting on the squeeze lever thereafter to draw the closure in fluid-tight contact with the mouth of the chamber, a third cam at a later point in the cycle of the chamber to shift the locking lever off its closure, said second cam being operative during the period that the third cam is operative.

25. The combination of a continuously rotating turret, a plurality of open-ended chambers on the turret, a closure for the mouth of each chamber, and means acting during the rotation of the turret to perform the following acts upon each closure in the order named: (1) to move the closure over the mouth of its chamber; (2) to block outward movement of the closure; (3) to draw the closure into fluid-tight contact with the mouth of the chamber; (4) to unblock the closure; and (5) to release the drawing means; a steam conduit connected with each chamber, and means to open the conduit to admit steam to the chamber during the period that the closure is over the mouth of the chamber.

26. The combination of a continuously rotating turret, a plurality of open-ended chambers on the turret, a closure for the mouth of each chamber, and cams at the sides of the turrets, said cams being operative during the rotation of the turret to perform the following acts upon each closure in the order named: (1) to move the closure over the mouth of its chamber; (2) to block outward movement of the closure; (3) to draw the closure into fluid-tight contact with the mouth of the chamber; (4) to unblock the closure; and (5) to release the drawing means; a steam conduit connected with each chamber, and means to open the conduit to admit steam to the chamber during the period that the closure is over the mouth of the chamber.

27. The combination of a continuously rotating turret, a plurality of open-ended chambers on the turret, a closure for the mouth of each member, a locking lever movable over the closure, and means acting during the rotation of the turret to perform the following acts in the order named: (1) to move the closure over the mouth of its chamber; (2) to move the locking lever over the closure; (3) to draw the locking lever against the closure; (4) to shift the locking lever off the closure; and (5) to release the drawing means; a steam conduit connected to each chamber, and means to close the conduit during the period in the cycle of the turret when the closure is out of contact with the mouths of the chambers.

28. The combination of a continuously rotating turret, a plurality of open-ended chambers on the turret, a closure for the mouth of each chamber, a locking lever movable over the closure, and cams at the sides of the turret, said cams being operative during the rotation of the turret to perform the following acts in the order named: (1) to move the closure over the mouth of its chamber; (2) to move the locking lever over the closure; (3) to draw the locking lever against the closure; (4) to shift the locking lever off the closure; and (5) to release the drawing means; a steam conduit connected to each chamber, and means to close the conduit during the period in the cycle of the turret when the closure is out of contact with the mouths of the chambers.

29. In a machine for puffing cereals or the like, the combination of an open-ended chamber, means for admitting steam to the interior of the chamber, a pivoted arm on the chamber, a threaded sleeve on the arm, a closure for the open end of the chamber, a stem on the closure loosely received in the sleeve, a rounded dome-shaped bearing on the top of the closure, an abutment on the outer end of the stem, the underside of the abutment having a concave socket, the ends of the sleeve having rounded inner and outer surfaces bearing upon the dome-shaped bearing and the inner side of the abutment, respectively, and means to rock the arm toward and from the open end of the chamber.

30. In a machine for puffing cereals or the like, the combination of an open-ended chamber, means for admitting steam to the interior of the chamber, a pivoted arm on the chamber, a threaded sleeve on the arm, a closure for the open end of the chamber, a stem on the closure loosely received in the sleeve, a rounded dome-shaped bearing on the top of the closure, an adjustable abutment on the outer end of the stem, a rounded concave surface on the inner side of said abutment, the ends of the sleeve having concave bearing surfaces to fit the dome-shaped bearing on the closure and the concave surface on the abutment, respectively, and means to hold the abutment in position on the stem to allow a limited axial movement of the stem in the sleeve, and means to rock the arm toward and from the open end of the chamber.

31. Apparatus for treating materials, comprising an open ended chamber, a conduit for admitting fluid pressure to the chamber, a pivoted closure movable over the end of the chamber, a lever pivoted adjacent the chamber one end of which is movable over the closure to lock the closure against the end of the chamber, a second lever pivoted to the first lever, means acting on the first lever to remove the end thereof from the closure, and means acting on the second lever to move the end of the first lever over the closure and then to draw the end of the first lever against the closure.

32. Apparatus for treating materials comprising an open ended chamber, a conduit for admitting steam to the chamber, a pivoted closure movable over the end of the chamber, a lever adjacent the chamber, one end of which is movable over the closure to lock the closure against the end of the chamber, an eccentric pivot pin for the said lever, a second lever connected to the pin, means to rock the second lever in one direction to draw the end of the first lever against the closure, and means to rock the second lever in the opposite direction to move the end of the first lever over the closure.

33. Apparatus for treating materials comprising an open ended chamber, a conduit for admitting steam to the chamber, a pivoted closure movable over the end of the chamber, a lever adjacent the chamber, one end of which is movable over the closure to lock the closure against the end of the chamber, an eccentric pivot pin for the said lever, a second lever connected to the pin, means to rock the second lever in one direction to draw the end of the first lever against the closure, means to rock the second lever in the opposite direction to move the end of the first lever over the closure, and additional means acting on the first lever arm to remove the end thereof from the closure.

34. Apparatus for treating materials comprising a rotatable turret, means for rotating the turret, an open ended chamber on the turret, a conduit for admitting steam to the chamber, a pivoted closure for the end of the chamber, a lever on the chamber, one end of which is movable over the closure to lock the closure against the end of the chamber, a second lever pivoted to the first lever, means acting on the first lever to remove the end thereof from the closure, and means acting on the second lever to move the end of the first lever over the closure and then to draw the end of the first lever toward the closure, all of the aforesaid means being operative during rotation of the turret.

35. Apparatus for treating materials comprising a rotatable turret, means for rotating the turret, an open ended treating chamber on the turret, a conduit for admitting steam to the chamber, a pivoted closure movable over the end of the chamber, a lever on the chamber one end of which is movable over the closure to lock the closure against the end of the chamber, an eccentric pivot pin for the said lever, a second lever connected to the pin, means to rock the second lever in one direction to draw the end of the first lever against the closure, and means to rock the second lever in the opposite direction to move the end of the first lever over the closure, all of the aforesaid means being operative during rotation of the turret.

36. Apparatus for treating materials comprising a rotatable turret, means for rotating the turret, an open ended treating chamber on the turret, a conduit for admitting steam to the chamber, a pivoted closure movable over the end of the chamber, a lever on the chamber one end of which is movable over the closure to lock the closure against the end of the chamber, means acting on the said lever to remove the end thereof from the closure, an eccentric pivot pin for the said lever, a second lever connected to the pin, means to rock the second lever in one direction to draw the end of the first lever against the closure, and means to rock the second lever in the opposite direction to move the end of the first lever over the closure, all of the aforesaid means being operative during rotation of the turret.

37. An apparatus in accordance with claim 34 in which the lever actuating means are stationary cams over which the levers move during rotation of the turret.

38. An apparatus in accordance with claim 35 which the lever actuating means are stationary cams over which the levers move during rotation of the turret.

39. An apparatus in accordance with claim 36 in which the lever actuating means are stationary cams over which the levers move during rotation of the turret.

(References on following page)

References Cited in the file of this patent

UNITED STATES PATENTS

| | | |
|---|---|---|
| 41,485 | Collins | Feb. 9, 1864 |
| 234,865 | Flanders | Nov. 30, 1880 |
| 2,116,212 | Plews | May 3, 1938 |
| 2,154,545 | Thwaits | Apr. 18, 1939 |
| 2,210,294 | James | Aug. 6, 1940 |
| 2,274,319 | Chesterman | Feb. 24, 1942 |
| 2,279,868 | Hayden | Apr. 14, 1942 |
| 2,290,129 | Moreland et al. | July 14, 1942 |
| 2,414,185 | Andrews | Jan. 14, 1947 |
| 2,539,990 | Chapman et al. | Jan. 30, 1951 |
| 2,579,399 | Buekberg | Dec. 18, 1951 |